United States Patent

Kamiyama et al.

Patent Number: 5,899,796
Date of Patent: *May 4, 1999

[54] ROTARY GRINDER ASSEMBLY AND A CUTTER ROBOT

[75] Inventors: Takao Kamiyama, Hiratsuka; Yasuhiro Yokoshima; Shigeru Endoh, both of Ibaraki-ken, all of Japan

[73] Assignees: Shonan Gosei-jushi Seisakusho K.K., Kanagawa-ken; Yokoshima & Company; GET, INC., both of Ibaraki-ken, all of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,987

[22] Filed: Jul. 16, 1997

[30] Foreign Application Priority Data

Jul. 19, 1996 [JP] Japan .................................. 8-190388

[51] Int. Cl.[6] ........................... B23B 41/08; B24B 27/06; E21B 29/00

[52] U.S. Cl. ........................... 451/61; 451/178; 451/344; 166/55.7

[58] Field of Search ................................... 451/178, 461, 451/27, 61, 344, 51

[56] References Cited

U.S. PATENT DOCUMENTS

| 4,648,454 | 3/1987 | Yarnell | 166/297 |
|---|---|---|---|
| 5,540,613 | 7/1996 | Kamiyama et al. | 451/24 |

Primary Examiner—David A. Scherbel
Assistant Examiner—Shantese McDonald
Attorney, Agent, or Firm—Whitham, Curtis & Whitham

[57] ABSTRACT

A mobile cutter robot for making a hole is equipped with a rotary grinder assembly consisting essentially of an abrasive body having an axis of rotation, a ball bearing coaxially embedded in the surface of the abrasive body, and a tubular connector by which the rotary grinder assembly is detachably connected to a drive shaft of the cutter robot.

14 Claims, 10 Drawing Sheets

ROTARY GRINDER ASSEMBLY AND A CUTTER ROBOT

BACKGROUND OF THE INVENTION

FIELD OF THE INVENTION

The present invention relates to a remote control rotary cutter robot equipped with a rotary grinder disk, which robot is used to bore through a hardened lining material at a certain step in a pipe repair operation wherein the lining material is applied to the inner wall of a pipe having a branch pipe branching therefrom.

DESCRIPTION OF THE PRIOR ART

When an underground main, such as a pipeline and a passageway, becomes defective or too old to perform properly, the main is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the main to be repaired by means of a pressurized fluid, like air and water. The tubular liner bag is made of a flexible resin-absorbent material impregnated with a liquid thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular flexible liner bag is made to gape wide and hooked (anchored) at the end of the defective or old main in a manner such that the wide-opened end of the liner bag completely and fixedly covers and closes an end of the main; a portion of the liner is pushed into the pipe so as to make an annular pocket; then, the pressurized fluid is applied into the annular pocket of the tubular liner such that the fluid urges the tubular liner to enter the main. Since one end of the tubular liner is hooked at the end of the main, it remains there while the rest of the flexible liner bag is turned inside out as it proceeds deeper in the main. (Hereinafter, this manner of insertion shall be called "everting" or "eversion".) When the entire length of the tubular liner bag is everted (i.e., turned inside out) into the main, the control rope holds the closed end of the tubular liner bag to thereby control the length of the tubular liner in the main. Then, the everted tubular liner is pressed against the inner wall of the main by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old main with a rigid liner without digging the ground and disassembling the main into sections.

Figure 18:
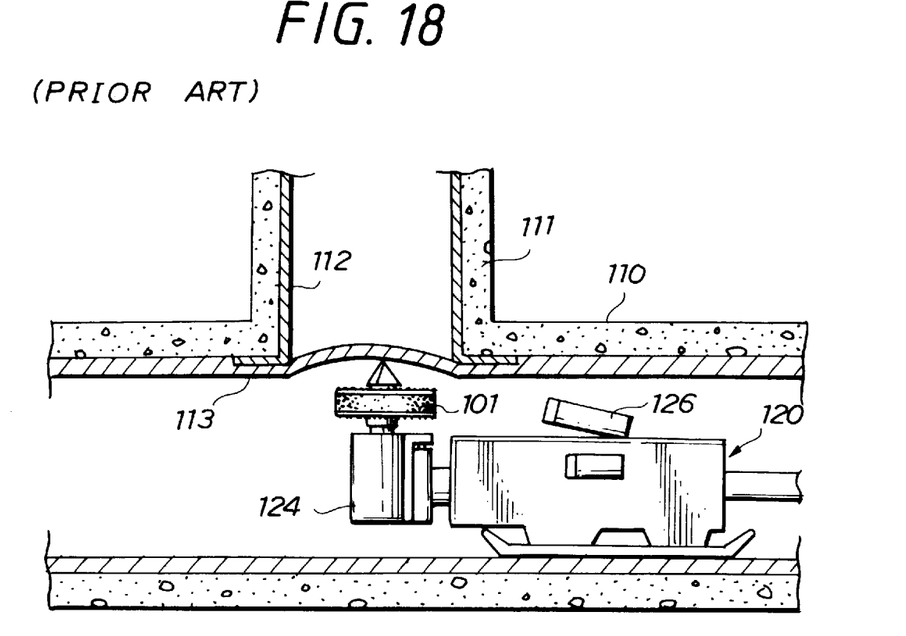
FIG. 18 is a cross section of underground pipes to show how a conventional hole saw type grinder assembly cuts open a hole in a liner.

Now, this method is similarly applicable to lining a branch pipe branching off a main. As shown in FIG. 18, when a main 110 is lined with a main liner 113 after a branch pipe 111 is lined with a branch pipe liner 112, the hole by which the branch pipe 111 opens into the main 110 (or the lower end opening of the branch pipe 111) is closed by the main liner 113, so that it is necessary to remove that portion of the main liner 113 which closes the hole so as to cause the branch pipe 111 to communicate with the main 110 again. To do the removal operation, an on-the-sleigh robot (cutter robot) 120, like the one shown in FIG. 18, having a hole saw type rotary grinder disk 101 is conventionally employed, which is brought in the main 110 and operated to cut and remove the said closing portion of the main liner 113. As shown in FIG. 18, the rotary grinder disk 101 is topped with a conical grinding cutter (reamer).

The on-the-sleigh robot 120 as described above comprises a robot main body, which is mounted on a pair of sleigh boards and thus capable of sliding to move in the main 110. On the robot main body are mounted a pair of flash lights and a TV camera 126 for monitoring the scenes inside the main 110 and thus facilitating the accurate remote control of the cutting operation. A motor 124 is supported on a slidable base coupled to the main body of the robot 120 by means of a piston rod, in a manner such that the motor 124 can be shifted up and down, and the rotary grinder disk 101 is locked about the end of the output shaft of the motor 124.

Thus, in an operation of removing that round portion of the liner 113 which closes the branch pipe 111, the on-the-sleigh cutter robot 120 is first introduced into the main 110 and brought to the optimum position, as shown in FIG. 18; then the motor 124 is started to turn the grinder disk 101 and as the grinder disk 101 together with the motor 124 is shifted up, the turning grinder disk 101 grinds through the main liner 113. After further shifting of the grinder disk 101 sideways as well as vertical, the obstacle portion of the liner 113 is removed by the grinder disk 101, and the communication between the main 110 and the branch pipe 111 is resumed.

Figure 19:
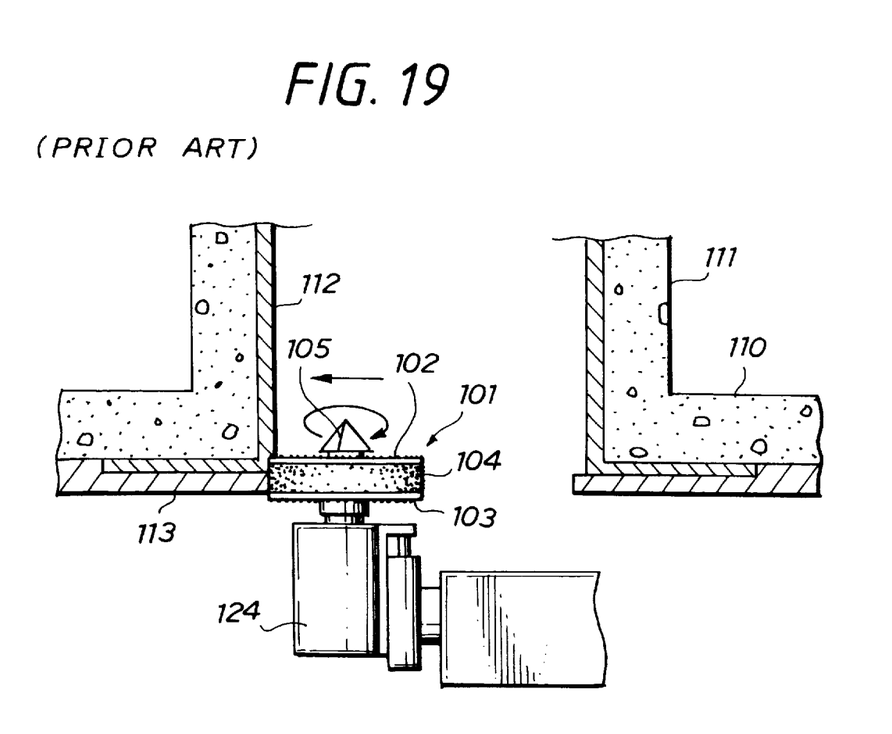
FIG. 19 is a cross section of underground pipes to show how the conventional hole saw type grinder assembly cuts open a hole in a liner.

Now, as shown in FIG. 19, the grinder disk 101 having an axis of rotation consists of: a disk-shaped support plate 104, whose peripheral surface of rotation parallel to the rotation axis is abrasive; upper and lower thin sanding plates 102, 103 parallel to each other, which are arranged in a row in axial direction to sandwich said support plate 104 between themselves and whose exposed faces, respectively, are abrasive; a tapered reamer 105 provided to form the spire of the grinder disk 101 rising axially from the middle of the upper sanding plate 102. This reamer 105, the sanding plates 102, 103, and the support disk 104 are assembled about the output shaft of the motor 124 and can be detached axially from the motor shaft.

Problems the Invention Seeks to Solve

As shown in FIG. 19, in cutting the obstacle portion of the main liner 113, the grinder disk 101, whose peripheral surface of rotation is mostly abrasive, tends to inadvertently grind into the branch pipe liner 112, and especially when the branch pipe is slant, it becomes more difficult to conduct the cutting operation without damaging the branch pipe liner 112.

The present invention was made in view of this problem, and it is therefore an object of the invention to provide a new cutter robot which is capable of selectively and safely cutting the main liner only.

SUMMARY OF THE INVENTION

Means to Solve the Problems

In order to attain the above and other objects of the invention, there is provided a mobile cutter robot equipped with a detachable rotary grinder assembly, which comprises (i) an abrasive body, which is a body of rotation having an axis of rotation, (ii) an inner ring body coaxially fixed to the abrasive body at a location substantially remote from foremost or rearmost end of said abrasive body, (iii) an outer ring body coaxially and freely slidably coupled onto the inner ring body, the outer ring body having an outer diameter substantially greater than the maximum outer diameter of the abrasive body and an outer diameter of the inner ring body, (iv) a racer element provided between the inner ring body and the outer ring body for enabling the ring bodies to freely slide against each other, and (v) a connector body by which the rotary grinder assembly is detachably connected to a drive shaft from the cutter robot; and at least part of the surface of that portion of the abrasive body which is located on the front side of the inner ring body being abrasive, and at least part of the surface of that portion of the abrasive body which is located on the rear side of the inner ring body being abrasive.

Preferably, the abrasive body has a conical head, and the tapered surface of this conical head is made abrasive. In an embodiment, the inner ring body and the outer ring body are located at a position immediately next to the conical head.

It is also effective to design such that the abrasive body has a cylindrical head, and a top surface and a peripheral surface of rotation of this cylindrical head are abrasive. In an embodiment, the inner ring body and the outer ring body are located at a position immediately next to this cylindrical head.

It is also effective to arrange such that the abrasive body has a cylindrical portion immediately next to the conical head, and a peripheral surface of rotation of the cylindrical portion is abrasive; and the cylindrical portion has a diameter equal to the maximum diameter of the conical head. In still another embodiment, the inner ring body and the outer ring body are located at a position immediately next to this cylindrical portion. It is preferable that the diameter of the cylindrical portion is substantially smaller than the minimum diameter of that part of the abrasive body which is located on the rear side of the inner ring body.

It is possible to design such that the abrasive body has another cylindrical portion immediately next to the cylindrical head, and the peripheral surface of rotation of this cylindrical portion is abrasive; and the cylindrical portion has a diameter substantially greater than that of the cylindrical head.

In preferred embodiments, the abrasive part of the surface of the abrasive body is covered with one or more kind of abrasive powder selected from diamond powder, super hard alloy powder, and tungsten carbide powder.

In a best mode embodiment, the outer ring body has a rounded peripheral surface.

It is recommended also that the inner ring body, the outer ring body and the racer element constitute a roller bearing such as a ball bearing.

A mobile cutter robot for making a hole is also proposed, which is equipped with any one of the rotary grinder assemblies as described above.

Effects of the Invention

According to the invention, in a rotary grinder assembly an inner ring body is coaxially fixed to the abrasive body at a location substantially remote from the foremost or the rearmost end of said abrasive body, and an outer ring body is coaxially and freely slidably coupled onto the inner ring body, and the outer ring body has an outer diameter substantially greater than the maximum outer diameter of the abrasive body, so that when the peripheral face of the outer ring body, at which the diameter of the grinder assembly is the largest, comes in contact with the inner wall of a branch pipe liner, the horizontal movement of the grinder assembly is stopped, and thus the abrasive faces of the abrasive body is prevented from reaching and thus grinding the inner wall of the branch pipe liner. At the same time, when the outer ring body comes in contact with the branch pipe liner, the rotation of the outer ring body is also stopped by the friction created between the outer ring body and the branch pipe liner, since the outer ring body is freely slidable against the inner ring body; hence, the outer ring body does not rub too much against the surface of the branch pipe liner. Therefore, during the cutting operation, the branch pipe liner is safe from being damaged by the abrasive body of the grinder assembly.

The above and other objects and features of the invention will appear more fully hereinafter in the following description given in connection with the accompanying drawings and the novelty thereof pointed out in the appended claims.

EMBODIMENTS

Next, embodiments of the invention will be described with reference to the attached drawings.

Embodiment 1

Figure 1:
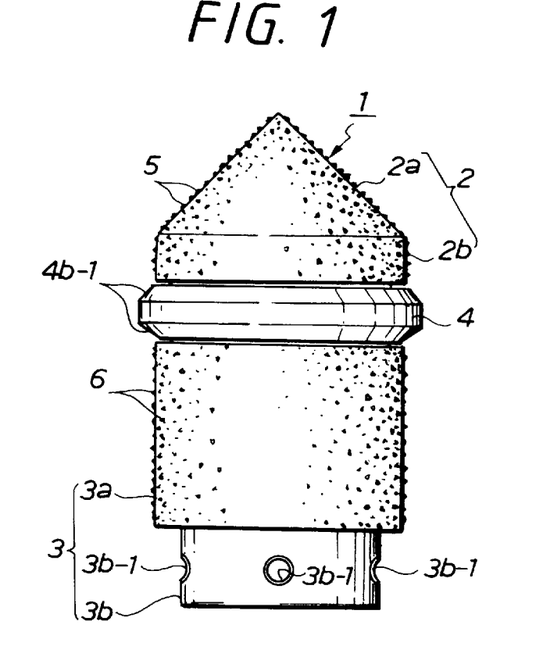
FIG. 1 is a side view of a grinder assembly according to a first embodiment of the invention.
Figure 2:
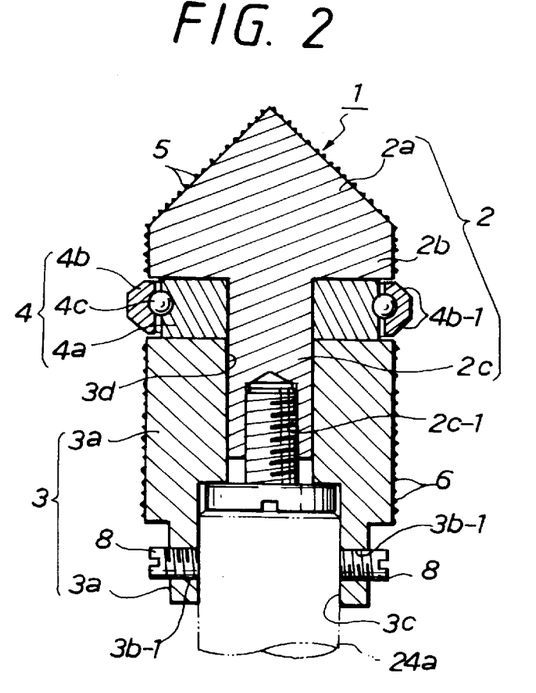
FIG. 2 is a vertical cross section of the grinder assembly of FIG. 1.

FIG. 1 is a side view of a grinder assembly according to a first embodiment of the invention and FIG. 2 is a vertical cross section of the grinder assembly.

A grinder assembly 1 of this embodiment is basically made up of following three members: (i) a top-like first member 2, which integrally consists of a conical reamer portion 2a, a cylindrical portion 2b and a shaft portion 2c extending axially downward from the center of the lower face of the cylindrical portion 2b (ref. FIG. 2), (ii) a second member 3, which is formed of a large-diameter portion 3a having an outer diameter equal to that of the cylindrical portion 2b of the first member 2 and a small-diameter portion 3b having a smaller outer diameter, and has axial central bores 3c, 3d, in which latter the shaft portion 2c of the first member 2 is inserted, and (iii) a ring member 4, through which the shaft portion 2c of the first member 2 penetrates before entering the bore 3d of the second member 3 so that the ring member 4 is sandwiched between the lower end face of the cylindrical portion 2b and the upper end face of the second member 3. The central bore 3c of the second member 3 has a larger diameter than the central bore 3d.

These three members 2, 3, 4 of the grinder assembly 1 are made of metals and are detachable from each other. As shown in FIG. 2, the lower end of the shaft portion 2c is formed with an axial tapped hole 2c-1. The taper surface of the reamer portion 2a and the peripheral surface of rotation of the cylindrical portion 2b of the first member 2 are uniformly coated with a layer of abrasive grain such as diamond powder, super hard alloy powder, and tungsten carbide powder, and thus these surfaces are made highly abrasive.

Similarly, the peripheral surface of rotation of the large-diameter portion 3a of the second member 3 is made abrasive. The small-diameter portion 3b of the second member 3 is formed with four tapped holes 3b-1, which extend horizontally and radially, and each of which forms an angle of 90 degrees with the neighboring holes.

The ring member 4 comprises a ball bearing having an outer diameter greater than that of the cylindrical portion 2b of the first member 2 and that of the large-diameter portion 3a of the second member 3. This ball bearing 4 consists of an inner ring 4a, an outer ring 4b and a plurality of balls 4c, which are aligned and held between the inner ring 4a and the outer ring 4b in a manner such that the balls 4c freely spin so fast that the outer ring 4b is capable of freely racing relative to the inner ring 4a, or vice versa. The outer ring 4b is chamfered at its external corners, so that when seen in cross section, as in FIG. 2, the outer ring 4b is tapered outwardly and has two tapered faces 4b-1.

Thus, in assembling the grinder assembly 1 of this embodiment, first, the shaft portion 2c of the first member 2 is passed through the vacancy of the ball bearing 4, and then inserted into the central bore 3d of the second member 3; next, a bolt 7 is inserted through the large-diameter bore 3c of the second member 3 and is screwed into the tapped hole 2c-1 formed in the shaft portion 2c of the first member 2 until the first member 2, the second member 3 and the ball bearing 4c are firmly combined together. As shown in FIG. 2, the inner ring 4a of the ball bearing 4 is locked between the first member 2 and the second member 3. The upper end face of the outer ring 4b of the ball bearing 4 is slightly spaced from the lower end face of the cylindrical portion 2b of the first member 2, and similarly the lower end face of the outer ring 4b is slightly spaced from the upper end face of the second member 3 so that the outer ring 4b is freely rotatable in relation to the inner ring 4a and the first member 2 and the second member 3.

Figure 3:
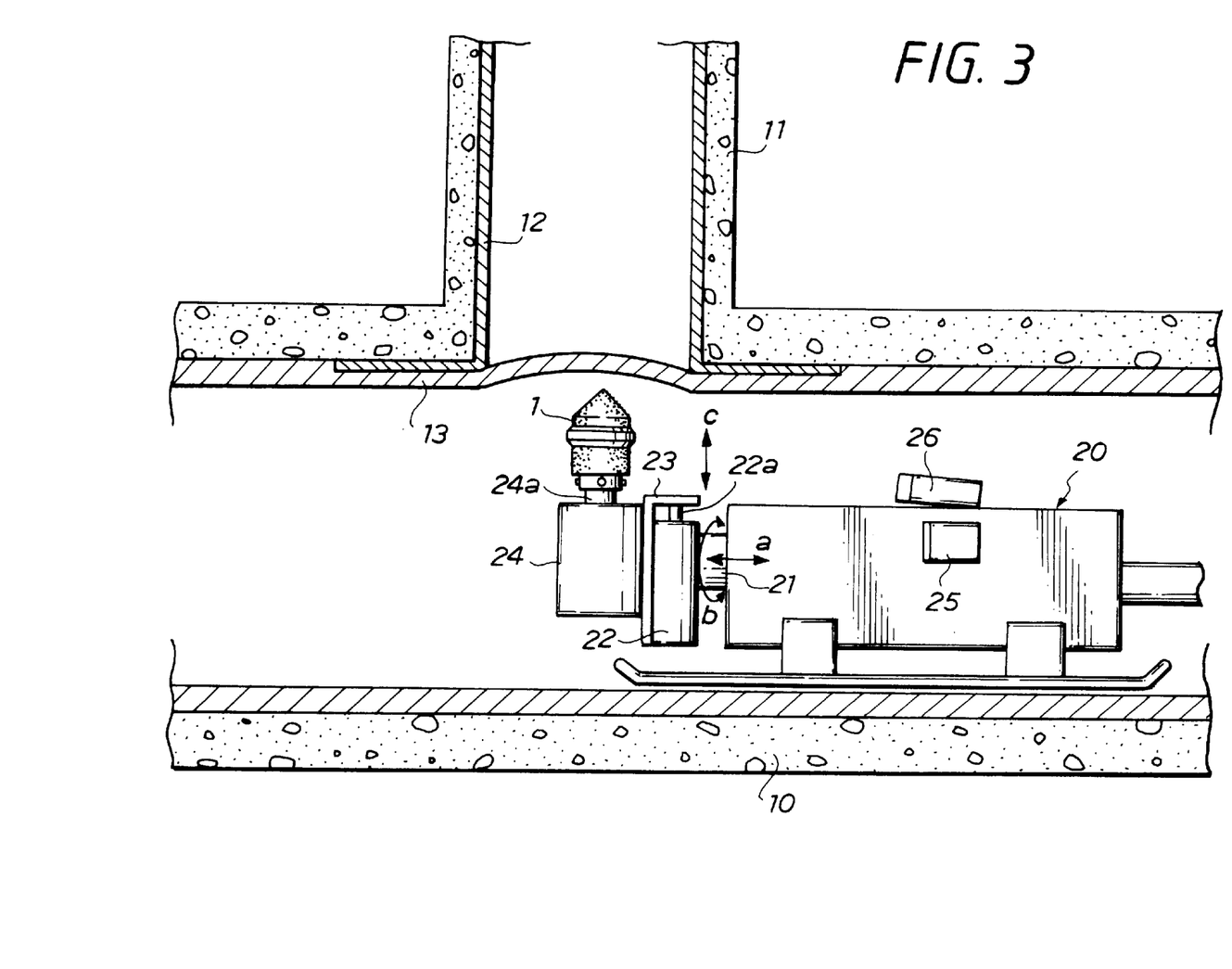
FIG. 3 is a vertical cross section of underground pipes where a pipe lining operation is conducted, and shows a step of a cutting operation in which a cutter robot equipped with the grinder assembly of FIG. 1 is employed.

The thus assembled grinder assembly 1 is detachably locked about a free end of an output shaft 24a of a hydraulically-operated motor 24 (ref. FIG. 3), described later. Specifically, as shown in FIG. 2, the output shaft 24a of the hydraulically-operated motor motor 24, which has a diameter slightly smaller than that of the bore 3c of the second member 3, is inserted into the bore 3c, and set screws 8, which threadably engage with the tapped holes 3b-1 formed in the small-diameter portion 3b of the second member 3, are screwed into the tapped holes 3b-1 until the grinder assembly 1 is securely locked about the free end of the output shaft 24a. Thus, the grinder assembly 1 is made ready for the grinding and cutting operation.

As shown in FIG. 3, an on-the-sleigh cutter robot 20 of the present embodiment has a main body, which has two pairs of parallel legs, which are pivotally shod with a pair of sleigh boards, and a pair of flash lights 25 are fixed on the sides of the main body and a TV camera 26 for monitoring is mounted on the main body.

Along the center line of the main body of an on-the-sleigh cutter robot 20 penetrates a thick slider rod 21, which is capable of sliding along the center line when driven hydraulically, as indicated by the double-pointed arrow a in FIG. 3, and also capable of spinning round about the center line, as indicated by the curved double-pointed arrow b. At the front end of the slider rod 21 is connected a hydraulically-operated piston cylinder 22, whose upward piston rod 22a supports a bracket 23, which is connected at the end of the rod 22a, so that the bracket 23 is vertically shifted relative to the piston cylinder 22. As described above, the grinder assembly 1 is locked about the end of the upward output shaft 24a of the hydraulically-operated motor motor 24. The output shaft 24a is adapted to slide vertically as shown by the double-pointed arrow c.

Although in the present embodiment the hydraulically-operated motor 24 is used as the drive source for the grinder assembly 1, it is possible to use other kinds of drive sources such as a fluid motor energized by means of air pressure or water pressure, and an electric motor.

Next, will be described an operation of cutting open a tubular liner closing a branch pipe by means of the grinder assembly 1 of the cutter robot 20 of the present embodiment, with reference to FIGS. 3 through 9. Incidentally, FIGS. 3 through 9 are vertical cross sections of underground pipes, showing respective steps of the cutting operation.

In FIG. 3, a reference numeral 10 designates an underground main, and 11 a branch pipe, which branches off the main 10 to extend toward the ground surface, and is already internally lined with a tubular liner 12 by the conventional lining method described earlier. The main 10 is also internally lined with a tubular liner 13 by the conventional lining method, but the lining of the main 10 was conducted after the lining of the branch pipe 11, so that, as shown in FIG. 3, the liner 13 covers up the lower end opening of the branch pipe 11, and, therefore, it is necessary to cut off that portion of the liner 13 which closes the lower end opening of the branch pipe 11 so as to allow the branch pipe 11 to communicate with the main 10. This cutting operation is conducted by means of the grinder assembly 1 of the present embodiment in the following manner.

As shown in FIG. 3, the on-the-sleigh cutter robot 20 is already brought inside the main 10. Now, the position of the cutter robot 20 is adjusted until the center of the grinder assembly 1 comes at about the middle of the lower end port of the branch pipe 11, as shown in FIG. 3, while the interior of the main 10, which is lightened by the flash lights 25, is monitored by an operator on the ground by means of the TV camera 26.

When the on-the-sleigh cutter robot 20 is prepared in the main 10 as described above, the hydraulically-operated motor 24 is driven to spin the grinder assembly 1 provided at the end of its output shaft 24a at a predetermined rotational speed.

Figure 4:
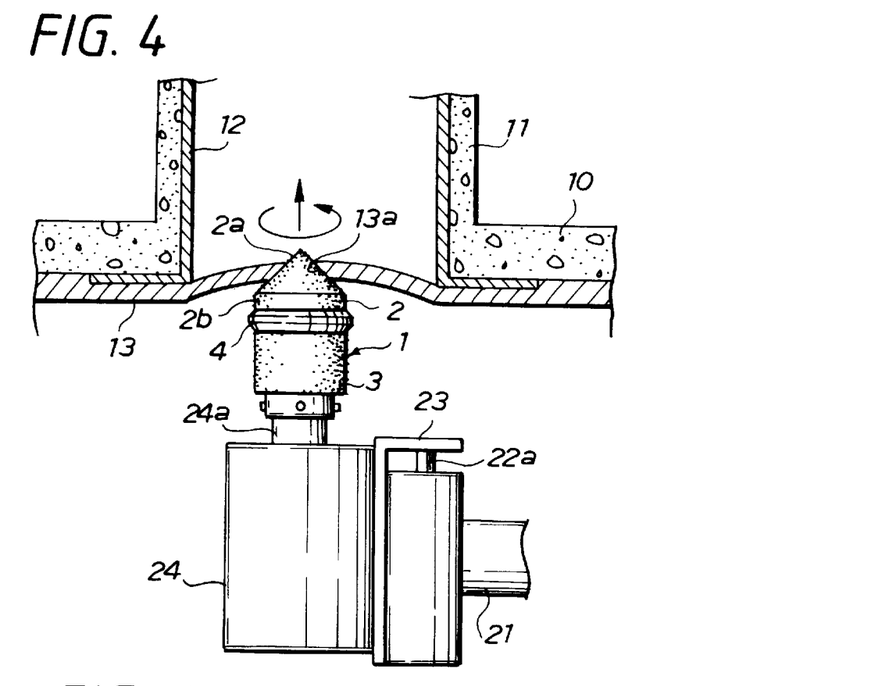
FIG. 4 is a vertical cross section of underground pipes showing another step of the cutting operation.
Figure 5:
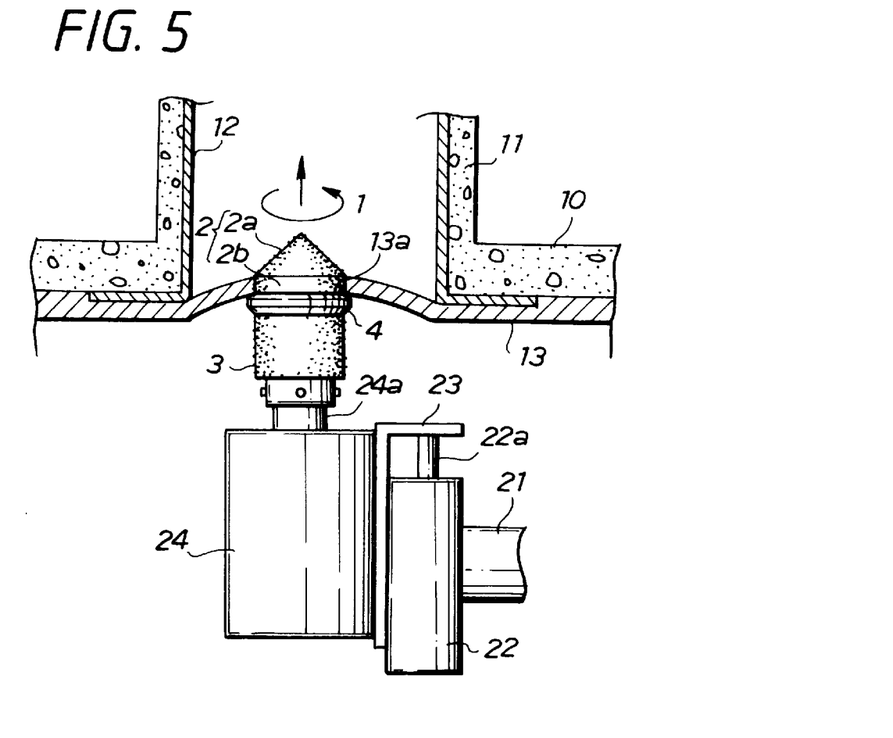
FIG. 5 is a vertical cross section of underground pipes showing another step of the cutting operation.
Figure 6:
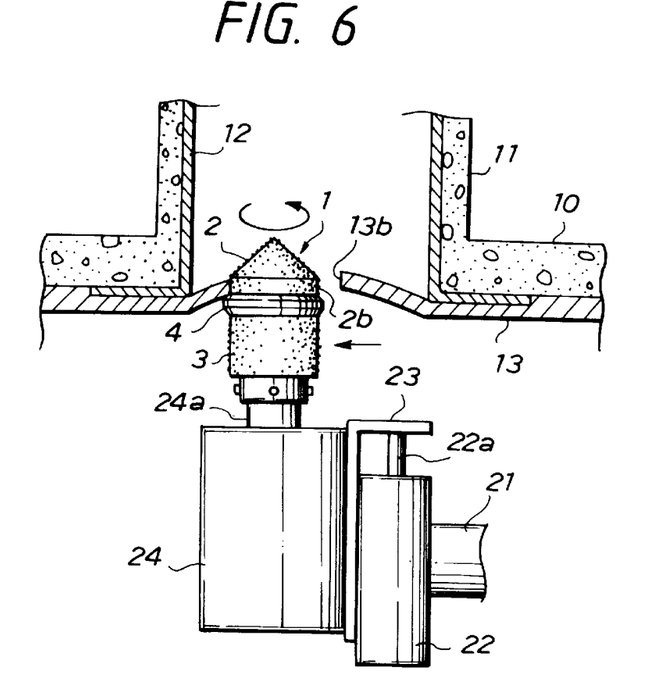
FIG. 6 is a vertical cross section of underground pipes showing another step of the cutting operation.
Figure 7:
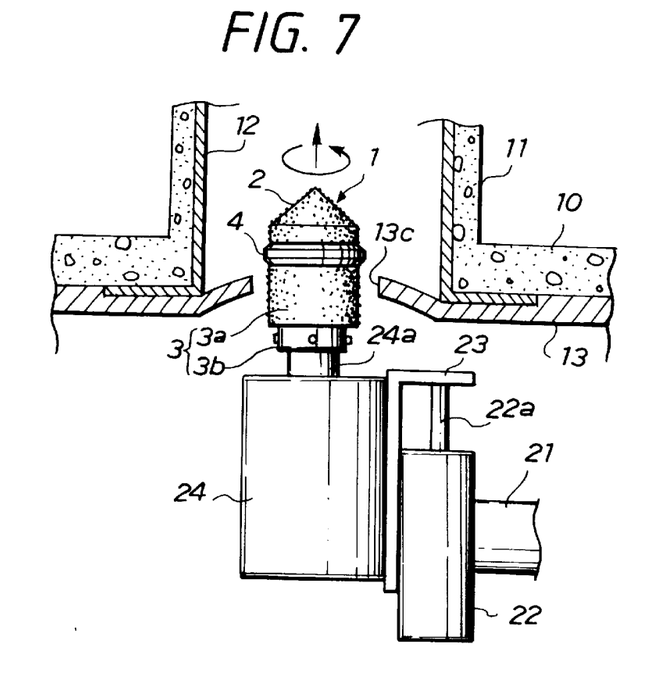
FIG. 7 is a vertical cross section of underground pipes showing another step of the cutting operation.

At this moment, the hydraulically-operated piston cylinder 22 is driven to thrust upward the piston rod 22a so that the hydraulically-operated motor 24 and the grinder assembly 1 are raised together, and as the result, the reamer portion 2a of the first member 2 of the grinder assembly 1 makes a small circular hole 13a in the tubular liner 13, as shown in FIG. 4. Then, as the grinder assembly 1 is further pushed up, the taper surface of the reamer portion 2a and the peripheral surface of rotation of the cylindrical portion 2b of the first member 2 of the grinder assembly 1 grind through the thickness of the tubular liner 13, and as the result, there is made in the tubular liner 13 a circular hole 13b, which has a diameter equal to that of the cylindrical portion 2b, as shown in FIG. 5. As soon as the circular hole 13b is made in the tubular liner 13, the operation of the hydraulically-operated piston cylinder 22 is ceased and the grinder assembly 1 is kept spinning at the height it is the grinder assembly 1 is kept spinning at the height it is assuming in FIG. 5; thereafter, the grinder assembly 1 is shifted horizontally, as shown in FIG. 6, so that the edge defining the circular hole 13b of the tubular liner 13 is ground away by the cylindrical portion 2b of the grinder assembly 1, whereby the hole 13b expands and becomes a new circular hole 13c, which has a diameter larger than that of the ball bearing 4, as shown in FIG. 7.

Then, again, the hydraulically-operated piston cylinder 22 is driven in a manner such that the grinder assembly 1 is further pushed up, whereupon the ball bearing 4 passes through the circular hole 13c. As soon as the grinder assembly 1 goes outside the tubular liner 13, as shown in FIG. 7, the operation of the hydraulically-operated piston cylinder 22 is ceased and the grinder assembly 1 is kept spinning at the height it is assuming in FIG. 7; thereafter, the slider rod 21 of the cutter robot 20 is displaced forward (leftward as viewed in FIG. 8) so that the grinder assembly 1 together with the piston cylinder 22 and the hydraulically-operated motor 24 is shifted forward, whereupon the abrasive peripheral surface of the second member 3 of the grinder assembly 1 grinds off the tubular liner 13, and as the result, there is made a bigger hole 13d in the tubular liner 13.

Figure 8:
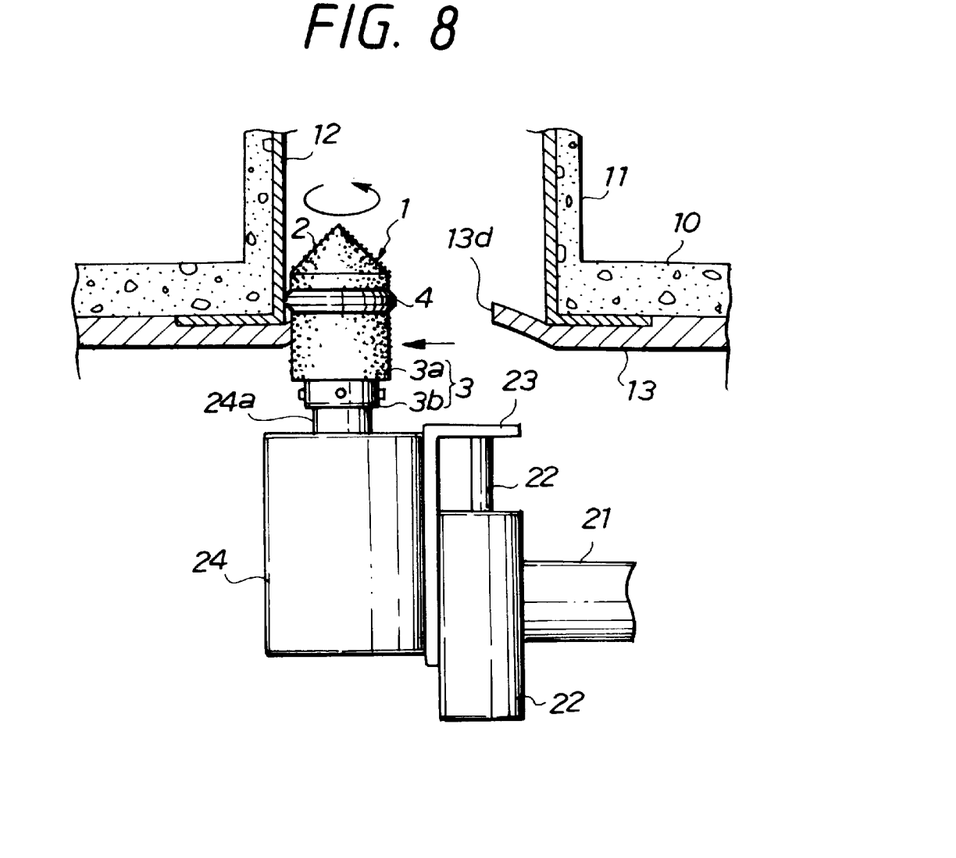
FIG. 8 is a vertical cross section of underground pipes showing still another step of the cutting operation.

However, as shown in FIG. 8, when the grinder assembly 1 has gone so far as to reach the inner wall of the branch pipe 11, or more specifically, when the outermost peripheral face of the outer ring 4b of the ball bearing 4 (ref. FIG. 2), at which the diameter of the grinder assembly 1 is the largest, comes in contact with the inner wall of the branch pipe liner 12, the horizontal movement of the grinder assembly 1 is stopped, and the rotation of the outer ring 4b is also stopped by the friction created between the ball bearing 4 and the branch pipe liner 12. However, since the inner ring 4a and the outer ring 4b of the ball bearing 4 are freely rotatable relative to each other, as described earlier, the inner ring 4a and the first member 2 and the second member 3 keep spinning in one body while the abrasive faces of the first member 2 and the second member 3 of the grinder assembly 1 are kept away from the branch pipe liner 12; therefore, the branch pipe liner 12 is safe from being damaged by the abrasive first member 2 or second member 3 of the grinder assembly 1.

Figure 9:
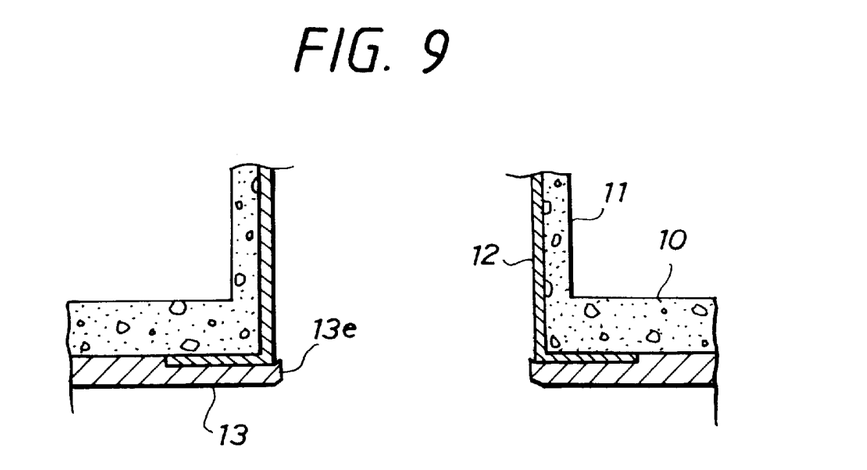
FIG. 9 is a vertical cross section of underground pipes after the cutting operation.

Then, the slider rod 21 of the cutter robot 20 is manipulated by remote controlling whereby the slider rod 21 is slid axially and turned about its axis variously until the grinder assembly 1 grinds off all of that part of the tubular liner 13 which can be reached by the abrasive surfaces of the grinder assembly 1. As a result, a circular hole 13e is made, which is defined virtually by the lower end opening of the branch pipe 11, as shown in FIG. 9, while the branch pipe liner 12 remains unharmed at all. Thus, the branch pipe 11 and the main 10 are made to communicate with each other at this hole 13e. Since the ball bearing 4 functions as a safety guard device, it is now possible for the human operator to bring the grinder assembly 1 as boldly close to the inner wall of the branch pipe liner 12 as he wishes without worrying about damaging the branch pipe liner 12, and thus the cutting operation becomes easier as well as more effective. Furthermore, it is possible to make the hole 13e more accurately and quickly by causing the grinder assembly 1 to trace along inner edge of the lower end opening of the branch pipe 11.

Embodiment 2

Figure 10:
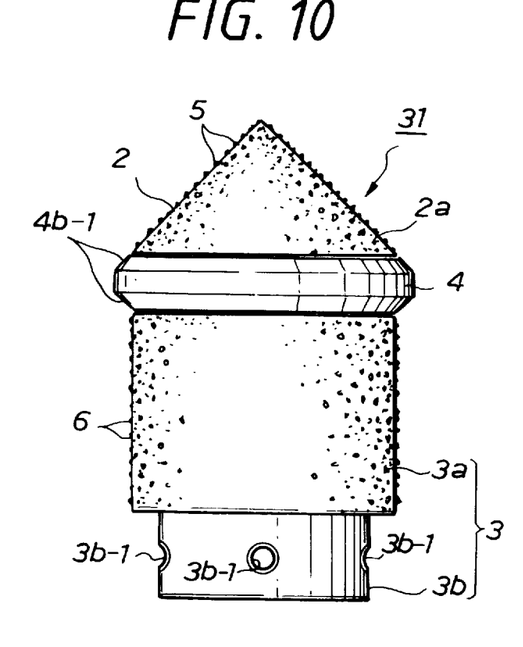
FIG. 10 is a side view of a grinder assembly according to a second embodiment of the invention.
Figure 11:
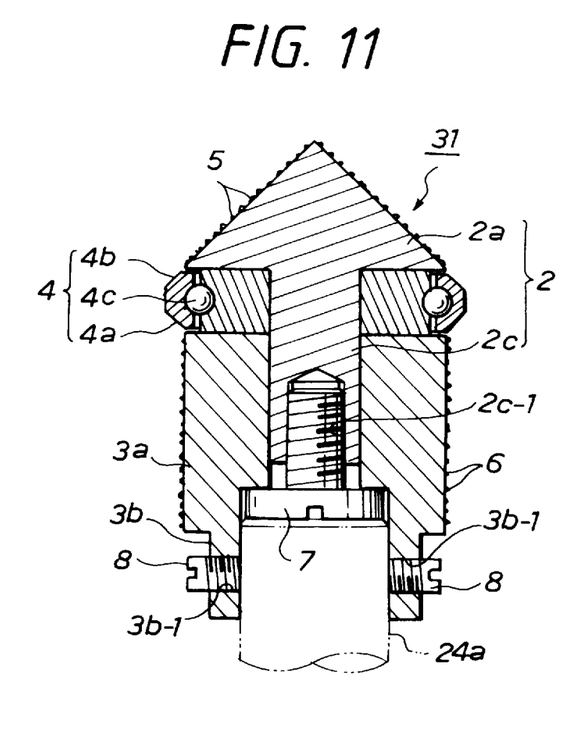
FIG. 11 is a vertical cross section of the grinder assembly of FIG. 10.
Figure 12:
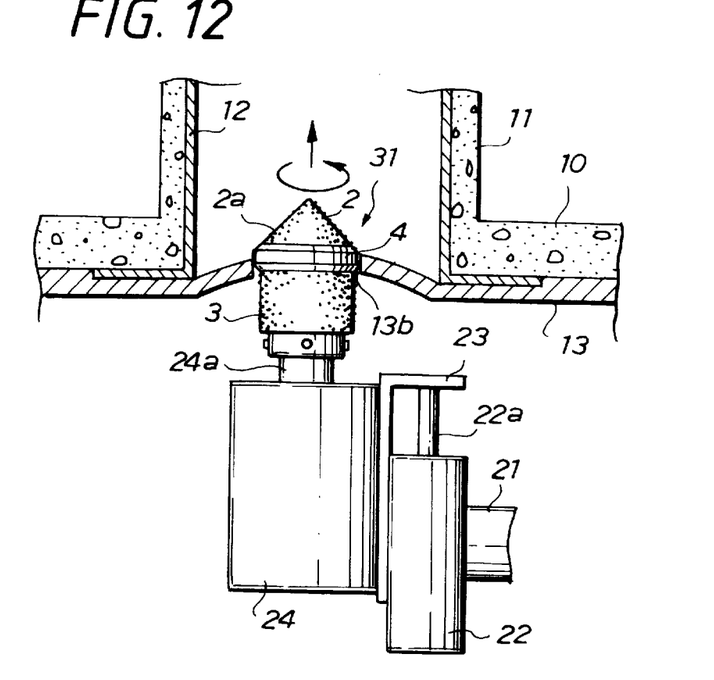
FIG. 12 is a vertical cross section of underground pipes where a pipe lining operation is conducted, and shows a step of a cutting operation in which a grinder assembly of FIG. 10 is employed.
Figure 13:
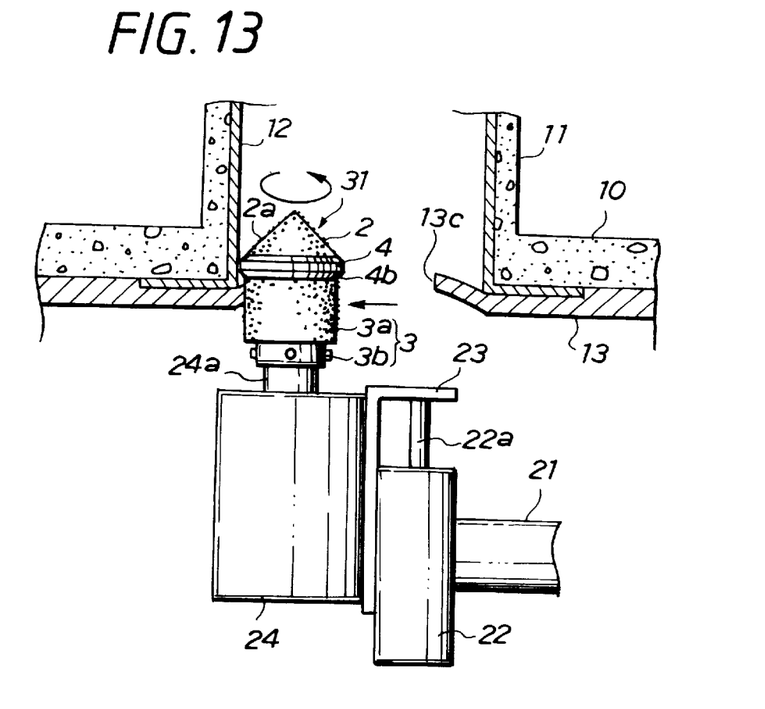
FIG. 13 is a vertical cross section of underground pipes showing another step of the cutting operation.

Next, a second embodiment of the present invention will be explained with reference to FIGS. 10 through 13. By the way, FIG. 10 is a side view of a grinder assembly according to the second embodiment of the invention; FIG. 11 is a vertical cross section of the same grinder assembly; and FIGS. 12 and 13 are vertical cross sections of underground pipes to show steps of a cutting operation in which the grinder assembly of FIG. 10 is employed. In these drawings such elements the likes of whom also appear in any of FIGS. 1 through 9 are given the same reference numerals as are given to their respective likes, and detailed description of them are not repeated.

A grinder assembly 31 of this embodiment differs from the grinder assembly 1 of the first embodiment only in the construction of the first member 2. Specifically, in the grinder assembly 31, the first member 2 consists only of a conical reamer portion 2a and a shaft portion 2c, and lacks the like of the cylindrical portion 2b of the grinder assembly 1 of the first embodiment.

With reference to FIGS. 12 and 13, wherein are shown steps of how a hole is made in a main liner 13 by means of the grinder assembly 31 of the present embodiment, a hydraulically-operated motor 24 is driven to spin the grinder assembly 31 locked at the end of its output shaft 24a at a predetermined rotational speed, and then, a hydraulically-operated piston cylinder 22 is driven to thrust upward a piston rod 22a so that the hydraulically-operated motor 24 and the grinder assembly 31 are raised together, and as the result, the abrasive reamer portion 2a of the grinder assembly 31 makes a circular hole 13b in that part of the tubular liner 13 which closes the lower opening of a branch pipe 11, as shown in FIG. 12. Then, as the grinder assembly 31 is further pushed up, a ball bearing 4 forces its way through the circular hole 13b, and goes outside the tubular liner 13.

Thereafter, the grinder assembly 31 is shifted horizontally so that the abrasive peripheral surface of the second member 3 of the grinder assembly 31 grinds away the edge defining the circular hole 13b of the tubular liner 13, whereby the hole 13b expands and becomes a bigger hole 13c. As in the case of the first embodiment, when the grinder assembly 31 has gone so far as to reach the inner wall of the branch pipe 11, or more specifically, when the outermost peripheral face of an outer ring 4b of the ball bearing 4 (ref. FIG. 11), at which the diameter of the grinder assembly 31 is the largest, comes in contact with the inner wall of the branch pipe liner 12, as shown in FIG. 13, the horizontal movement of the grinder assembly 31 is stopped, and the rotation of the outer ring 4b is also stopped by the friction created between the ball bearing 4 and the branch pipe liner 12. However, since an inner ring 4a and the outer ring 4b of the ball bearing 4 are freely rotatable relative to each other, the inner ring 4a and the first member 2 and a second member 3 keep spinning in one body while the abrasive faces of the first member 2 and the second member 3 of the grinder assembly 31 are kept away from the branch pipe liner 12; therefore, the branch pipe liner 12 is safe from being damaged by the grinder assembly 31.

Then, the grinder assembly 31 is shifted extensively by manipulating a slider rod 21 of a cutter robot by remote controlling until all of that part of the tubular liner 13 which can be reached by the abrasive surfaces of the grinder assembly 31 is ground off. As a result, a circular hole defined virtually by the lower end opening of the branch pipe 11 is made, while the branch pipe liner 12 remains unharmed at all, and the branch pipe 11 and the main 10 are made to communicate with each other at this hole.

Embodiment 3

Figure 14:
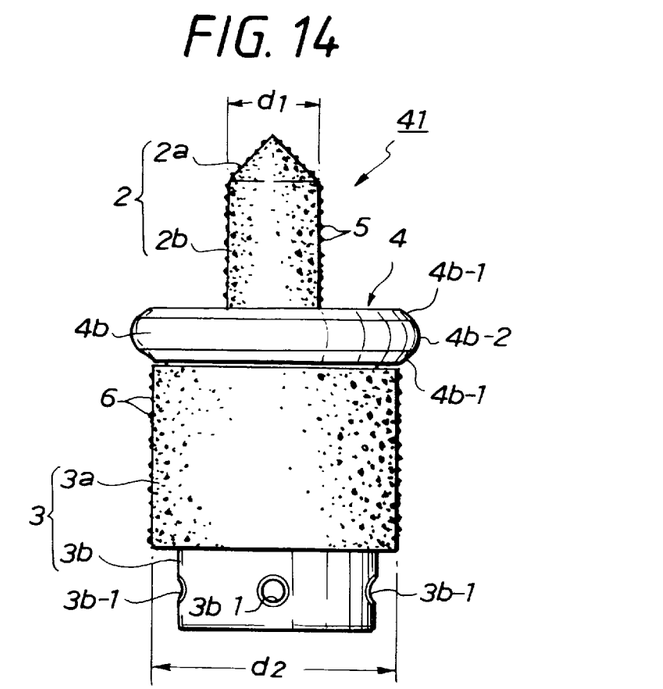
FIG. 14 is a side view of a grinder assembly according to a third embodiment of the invention.
Figure 15:
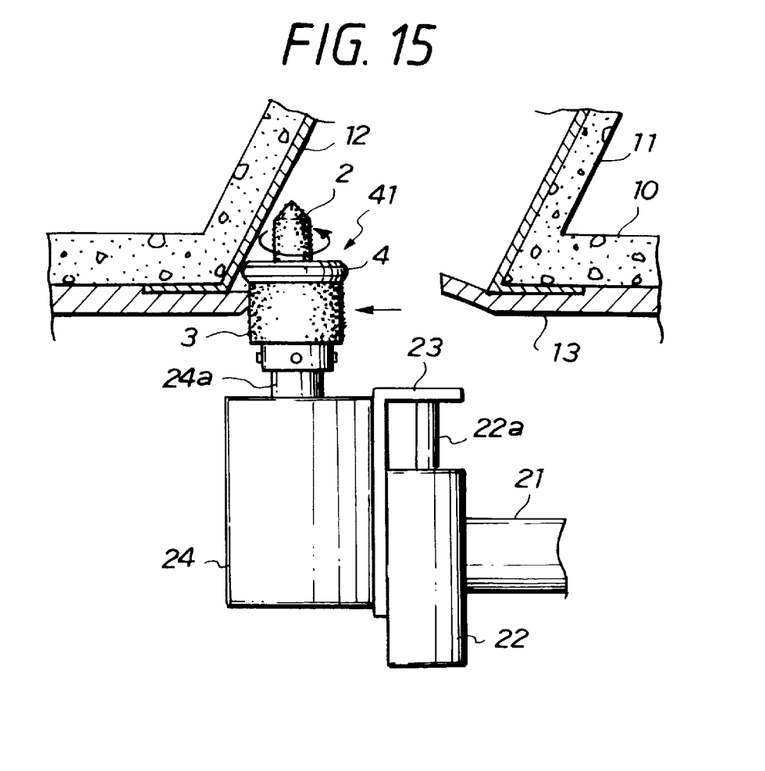
FIG. 15 is a vertical cross section of underground pipes where a pipe lining operation is conducted, and shows a step of a cutting operation in which a grinder assembly of FIG. 14 is employed.

Next, a third embodiment of the present invention will be explained with reference to FIG. 14 and FIG. 15. By the way, FIG. 14 is a side view of a grinder assembly according to the third embodiment of the invention, and FIG. 15 is a vertical cross section of underground pipes to show a step of a cutting operation in which the grinder assembly of FIG. 14 is employed. In these drawings such elements the likes of whom also appear in any of FIGS. 1 through 9 are given the same reference numerals as are given to their respective likes, and detailed description of them are not repeated.

A grinder assembly 41 of this embodiment differs from the grinder assembly 1 of the first embodiment in two respects only:

(i) the diameter $d_1$ of the cylindrical portion 2b of the first member 2 of the grinder assembly 41 of the third embodiment is made substantially smaller than the diameter $d_2$ of the large-diameter portion 3a of the second member 3 (i.e., $d_1 < d_2$); (ii) the peripheral surface of the outer ring 4b of the ball bearing 4 is formed in a manner such that, when seen in profile, the two corners that connected the two tapered faces 4b-1 to the vertical peripheral face in the first embodiment are removed by creating, in place of the vertical peripheral face, a rounded face 4b-2, which continuously connects the two tapered faces 4b-1.

The grinder assembly 41 of the present embodiment is preferably used in cases wherein a branch pipe 11 is slant, like the one in FIG. 15. Since the diameter of the first member 2 is much smaller than the ball bearing 4, even when the grinder assembly 41 is brought so close to the overhanging inner wall of the branch pipe 11 that the ball bearing 4 hits upon the branch pipe liner 12, the abrasive first member 2 of the grinder assembly 41 does not reach and damage the branch pipe liner 12.

Embodiment 4

Figure 16:
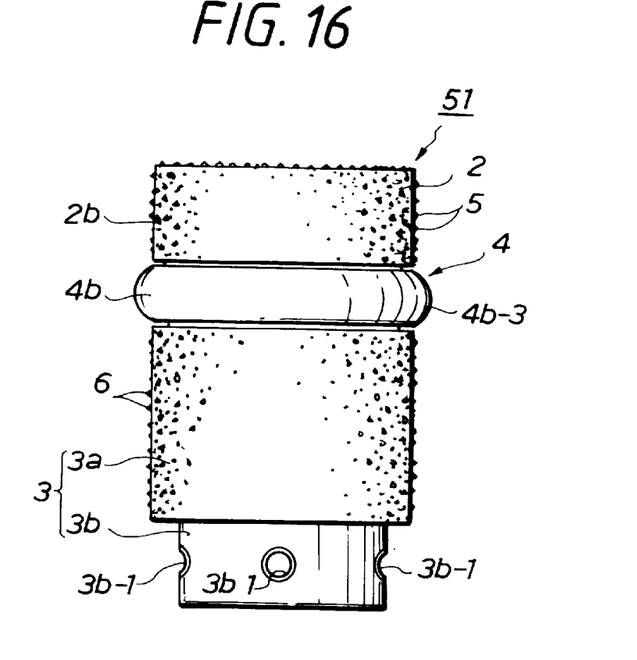
FIG. 16 is a side view of a grinder assembly according to a fourth embodiment of the invention.

Next, a fourth embodiment of the present invention will be explained with reference to FIG. 16. By the way, FIG. 16 is a side view of a grinder assembly according to the fourth embodiment of the invention, and in this drawing such elements the likes of whom also appear in FIG. 1 are given the same reference numerals as are given to their respective likes.

A grinder assembly 51 of this embodiment differs from the grinder assembly 1 of the first embodiment in two respects only:

(i) the first member 2 lacks the conical reamer portion 2a so that the cylindrical portion 2b constitutes the top of the grinder assembly 51; (ii) the entire peripheral surface of the outer ring 4b of the ball bearing 4 is rounded to form a curved face 4b-3.

Thus, similarly as in the first embodiment, by using the grinder assembly 51 of the present embodiment, it is possible to conduct the hole making operation with increased speed, simplicity, efficiency and accuracy.

Embodiment 5

Figure 17:
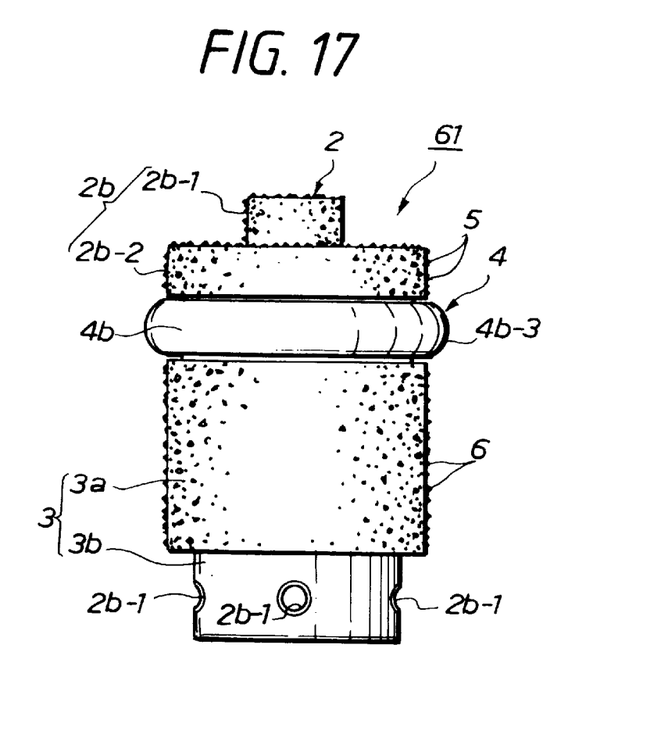
FIG. 17 is a side view of a grinder assembly according to a fifth embodiment of the invention.

Next, a fifth embodiment of the present invention will be explained with reference to FIG. 17, which is a side view of a grinder assembly according to the fifth embodiment of the invention, and in this drawing those elements the likes of whom also appear in FIG. 16 are given the same reference numerals as are given to their respective likes.

A grinder assembly 61 of this embodiment differs from the grinder assembly 51 of the fourth embodiment in a single respect only: the cylindrical portion 2b of the first member 2 is made up of two parts: a small-diameter part 2b-1 and a large-diameter part 2b-2.

Thus, similarly as in the first embodiment as well as the third embodiment, by using the grinder assembly 61 of the present embodiment, it is possible to conduct the hole making operation with increased speed, simplicity, efficiency and accuracy.

Results of the Invention

As is clear from the above description of the embodiments of this invention, in each case, the grinder assembly is equipped with a ball bearing 4, which has an outer diameter greater than the diameter of any other element of the grinder assembly, and the location of the ball bearing 4 is such that the peripheral surface of rotation of the ball bearing 4 is between those surfaces of the first member 2 and the second member 3, so that when the rotating grinder assembly is shifted horizontally and the peripheral surface of rotation of the ball bearing 4 comes in contact with the inner wall 12 of the branch pipe 11, the horizontal movement of the grinder assembly is stopped and, thus, the abrasive peripheral surfaces of the first member 2 and the second member 3 will not reach and damage the wall 12, and furthermore, since the outer ring 4b of the ball bearing 4 is freely rotatable relative to the inner ring 4a by virtue of the balls 4c, the outer ring 4a suddenly stops turning (starts racing on the inner ring 4a) while rest of the grinder assembly keeps turning, so that the outer ring 4a does not damage the wall either. Thus with the new grinder assembly proposed herein, the human operator can bring the grinder assembly as boldly close to the wall 12 as he wishes without worrying about damaging it, and thus the cutting operation can be conducted with increased speed, simplicity, efficiency and accuracy.

While the invention has been described in its preferred embodiment, it is to be understood that modifications will occur to those skilled in he art without departing from the spirit of the invention.

What is claimed is:

1. A rotary grinder assembly for making a hole, comprising (i) an abrasive body, which is a body of rotation having an axis of rotation, (ii) an inner ring body coaxially fixed to said abrasive body at a location substantially remote from foremost and rearmost end of said abrasive body, (iii) an outer ring body coaxially and freely raceably coupled onto said inner ring body, said outer ring body having an outer diameter substantially greater than the maximum outer diameter of said abrasive body and an outer diameter of said inner ring body, (iv) a racer means provided between said inner ring body and said outer ring body for enabling said ring bodies to freely race relative to each other, and (v) a connector body by which the rotary grinder assembly is connected to a drive shaft; at least part of the surface of that portion of the abrasive body which is located on the fore side of said inner ring body being abrasive, and at least part of the surface of that portion of the abrasive body which is located on the rear side of said inner ring body being abrasive.

2. The rotary grinder assembly as recited in claim 1, wherein said abrasive body has a conical head at said foremost end, and the tapered surface of this conical head is abrasive.

3. The rotary grinder assembly as recited in claim 2, wherein said inner ring body and said outer ring body are located at a position immediately next to said conical head.

4. The rotary grinder assembly as recited in claim 2, wherein said abrasive body has a cylindrical portion immediately next to said conical head, and a peripheral surface of rotation of said cylindrical portion is abrasive; said cylindrical portion having a diameter equal to the maximum diameter of said conical head.

5. The rotary grinder assembly as recited in claim 4, wherein said inner ring body and said outer ring body are located at a position immediately next to said cylindrical portion.

6. The rotary grinder assembly as recited in claim 5, wherein the diameter of said cylindrical portion is substantially smaller than the minimum diameter of that part of the abrasive body which is located on the rear side of the inner ring body.

7. The rotary grinder assembly as recited in claim 1, wherein said abrasive body has a cylindrical head, and a top surface and a peripheral surface of rotation of this cylindrical head are abrasive.

8. The rotary grinder assembly as recited in claim 7, wherein said inner ring body and said outer ring body are located at a position immediately next to said cylindrical head.

9. The rotary grinder assembly as recited in claim 7, wherein said abrasive body has another cylindrical portion immediately next to the cylindrical head, and the peripheral surface of rotation of said cylindrical portion is abrasive; said cylindrical portion having a diameter substantially greater than that of the cylindrical head.

10. The rotary grinder assembly as recited in claim 9, wherein said inner ring body and said outer ring body are located at a position immediately next to said another cylindrical portion.

11. The rotary grinder assembly as recited in claim 1, wherein the abrasive part of the surface of the abrasive body is covered with at least one or more kind of abrasive powder selected from diamond powder, super hard alloy powder, and tungsten carbide powder.

12. The rotary grinder assembly as recited in claim 1, wherein said outer ring body has a rounded peripheral surface.

13. The rotary grinder assembly as recited in claim 1, wherein said inner ring body, said outer ring body and said racer means constitute a ball bearing.

14. A mobile cutter robot for making a hole, equipped with a rotary grinder assembly, which comprises (i) an abrasive body, which is a body of rotation having an axis of rotation, (ii) an inner ring body coaxially fixed to said abrasive body at a location substantially remote from foremost and rearmost end of said abrasive body, (iii) an outer ring body coaxially and freely raceably coupled onto said inner ring body, said outer ring body having an outer diameter substantially greater than the maximum outer diameter of said abrasive body and an outer diameter of said inner ring body, (iv) a racer means provided between said inner ring body and said outer ring body for enabling said ring bodies to freely race relative to each other, and (v) a connector body by which the rotary grinder assembly is connected to a drive shaft; at least part of the surface of that portion of the abrasive body which is located on the fore side of said inner ring body being abrasive, and at least part of the surface of that portion of the abrasive body which is located on the rear side of said inner ring body being abrasive.

* * * * *